United States Patent
Candell et al.

(10) Patent No.: US 8,982,928 B2
(45) Date of Patent: Mar. 17, 2015

(54) ADVANCED MULTI-USER DETECTOR

(71) Applicants: Richard Candell, Clarksburg, MD (US); Paul Ebert, Lansdowne, VA (US); John Fossaceca, Frederick, MD (US); Greg Handermann, Lovettsville, VA (US); Mark Holland, Annapolis, MD (US); Lajuana Johnson, Pikesville, MD (US); Bruce L. McKinley, South Riding, VA (US); Bo Wang, Chantilly, VA (US); Ralph Eugene Crenshaw, Crownsville, MD (US)

(72) Inventors: Richard Candell, Clarksburg, MD (US); Paul Ebert, Lansdowne, VA (US); John Fossaceca, Frederick, MD (US); Greg Handermann, Lovettsville, VA (US); Mark Holland, Annapolis, MD (US); Lajuana Johnson, Pikesville, MD (US); Bruce L. McKinley, South Riding, VA (US); Bo Wang, Chantilly, VA (US); Ralph Eugene Crenshaw, Crownsville, MD (US)

(73) Assignee: Comtech Mobile Datacom Corporation, Germantown, MD (US)

( * ) Notice: Subject to any disclaimer, the term of this patent is extended or adjusted under 35 U.S.C. 154(b) by 0 days.

(21) Appl. No.: 14/041,491

(22) Filed: Sep. 30, 2013

(65) Prior Publication Data
US 2014/0029649 A1    Jan. 30, 2014

Related U.S. Application Data

(63) Continuation of application No. 12/692,789, filed on Jan. 25, 2010, now Pat. No. 8,548,107.

(60) Provisional application No. 61/147,253, filed on Jan. 26, 2009.

(51) Int. Cl.
*H04B 1/00*    (2006.01)
*H04B 1/7103*  (2011.01)
(Continued)

(52) U.S. Cl.
CPC ............. *H04B 1/7103* (2013.01); *H04B 7/216* (2013.01); *H04B 7/18513* (2013.01)
USPC ........... 375/148; 375/346; 375/316; 375/130; 375/144; 375/142; 375/150; 455/136

(58) Field of Classification Search
USPC ......... 375/148, 346, 316, 130, 144, 142, 150; 455/136
See application file for complete search history.

(56) References Cited

U.S. PATENT DOCUMENTS
4,486,739 A    12/1984    Franaszek et al.
4,649,396 A     3/1987    Friedman
(Continued)

FOREIGN PATENT DOCUMENTS
DE    102004016548 A1    10/2005
EP        1406207 A1     4/2004

OTHER PUBLICATIONS
Berthet, Synchronization complexity for a satellite multimedia burst receiver, undated, 5 pgs.
(Continued)

*Primary Examiner* — Zewdu Kassa
(74) *Attorney, Agent, or Firm* — Morgan, Lewis & Bockius LLP

(57) ABSTRACT

A method for detecting multi-user signals including conducting a first energy burst detection detecting a first plurality of user signals as a first energy burst, attempting to decode a user signal from the first plurality of signals within the first energy burst, cancelling out a first user signal from the first energy burst if the first user signal is successfully decoded from the first energy burst, determining a second user signal to be discarded if the second user signal is not successfully decoded from the first energy burst, conducting a second energy burst detection detecting a second plurality of signals as a second burst, and iteratively cancelling out the first user signal successfully decoded from the first energy burst from the second energy burst, wherein the second energy burst detection is conducted when all user signals within the first energy burst are either cancelled out or determined to be discarded.

9 Claims, 6 Drawing Sheets

(51) Int. Cl.
*H04B 7/216* (2006.01)
*H04B 7/185* (2006.01)

(56) References Cited

U.S. PATENT DOCUMENTS

| | | | |
|---|---|---|---|
| 4,876,737 A | 10/1989 | Woodworth et al. | |
| 4,901,307 A | 2/1990 | Gilhousen et al. | |
| 5,109,390 A | 4/1992 | Gilhousen et al. | |
| 5,309,474 A | 5/1994 | Gilhousen et al. | |
| 5,376,778 A | 12/1994 | Kreft | |
| 5,490,165 A | 2/1996 | Blakeney, II et al. | |
| 5,537,397 A | 7/1996 | Abramson | |
| 5,559,790 A | 9/1996 | Yano et al. | |
| 5,566,168 A | 10/1996 | Dent | |
| 5,568,472 A | 10/1996 | Umeda et al. | |
| 5,570,350 A | 10/1996 | Myer et al. | |
| 5,594,454 A | 1/1997 | Devereux et al. | |
| 5,612,949 A | 3/1997 | Bennett | |
| 5,625,629 A | 4/1997 | Wenk | |
| 5,640,166 A | 6/1997 | Siwiak | |
| 5,668,556 A | 9/1997 | Rouffet et al. | |
| 5,694,396 A | 12/1997 | Firouzbakht et al. | |
| 5,697,050 A | 12/1997 | Wiedeman | |
| 5,724,384 A | 3/1998 | Kim et al. | |
| 5,758,260 A | 5/1998 | Wiedeman | |
| 5,790,070 A | 8/1998 | Natarajan et al. | |
| 5,796,777 A | 8/1998 | Terlep et al. | |
| 5,815,071 A | 9/1998 | Doyle | |
| 5,818,883 A | 10/1998 | Smith et al. | |
| 5,835,069 A | 11/1998 | Skoog | |
| 5,841,765 A | 11/1998 | Fielding et al. | |
| 5,872,777 A | 2/1999 | Brailean et al. | |
| 5,920,278 A | 7/1999 | Tyler et al. | |
| 5,983,111 A | 11/1999 | Kim | |
| 5,999,561 A | 12/1999 | Naden et al. | |
| 6,052,561 A | 4/2000 | Rudowicz et al. | |
| 6,084,919 A | 7/2000 | Kleider et al. | |
| 6,088,413 A | 7/2000 | Autry et al. | |
| 6,100,806 A | 8/2000 | Gaukel | |
| 6,121,922 A | 9/2000 | Mohan | |
| 6,128,276 A | 10/2000 | Agee | |
| 6,128,469 A | 10/2000 | Zenick, Jr. et al. | |
| 6,151,313 A | 11/2000 | Abramson | |
| 6,163,681 A | 12/2000 | Wright et al. | |
| 6,185,245 B1 | 2/2001 | Kim | |
| 6,188,682 B1 | 2/2001 | Takagi et al. | |
| 6,205,167 B1 | 3/2001 | Kamgar et al. | |
| 6,226,531 B1 | 5/2001 | Holt et al. | |
| 6,301,316 B1 | 10/2001 | Uchida et al. | |
| 6,307,840 B1 | 10/2001 | Wheatley, III et al. | |
| 6,317,029 B1 | 11/2001 | Fleeter | |
| 6,339,611 B1 | 1/2002 | Antonio et al. | |
| 6,349,110 B1 | 2/2002 | Davidovici et al. | |
| 6,353,730 B1 | 3/2002 | Buettner et al. | |
| D455,641 S | 4/2002 | Trifilio | |
| 6,373,831 B1 | 4/2002 | Secord et al. | |
| 6,396,819 B1 | 5/2002 | Fleeter et al. | |
| 6,421,373 B1 | 7/2002 | Saito | |
| 6,438,118 B1 | 8/2002 | Matui | |
| 6,507,602 B1* | 1/2003 | Dent | 375/142 |
| 6,510,172 B1 | 1/2003 | Miller | |
| 6,529,488 B1 | 3/2003 | Urs et al. | |
| 6,549,559 B2 | 4/2003 | Kamgar et al. | |
| 6,574,205 B1 | 6/2003 | Sato | |
| 6,628,699 B2 | 9/2003 | Ramberg et al. | |
| 6,639,906 B1 | 10/2003 | Levin | |
| 6,683,605 B1 | 1/2004 | Bi et al. | |
| 6,720,801 B2 | 4/2004 | Houlberg | |
| 6,728,298 B1 | 4/2004 | Okubo et al. | |
| 6,754,190 B2 | 6/2004 | Gurney et al. | |
| 6,763,056 B1 | 7/2004 | Ohsuge | |
| 6,768,729 B1 | 7/2004 | Ohsuge | |
| 6,799,094 B1 | 9/2004 | Vaida et al. | |
| 6,826,169 B1 | 11/2004 | Nagatani et al. | |
| 6,876,645 B1 | 4/2005 | Guey et al. | |
| 6,894,995 B2 | 5/2005 | Chitrapu et al. | |
| 6,944,149 B1 | 9/2005 | Kim et al. | |
| 6,985,512 B1 | 1/2006 | McDermott et al. | |
| 7,006,032 B2 | 2/2006 | King et al. | |
| 7,053,767 B2 | 5/2006 | Petite et al. | |
| 7,110,435 B1 | 9/2006 | Sorrells et al. | |
| 7,131,136 B2 | 10/2006 | Monroe | |
| 7,203,630 B2 | 4/2007 | Kolb et al. | |
| 7,227,884 B2 | 6/2007 | McDermott | |
| 7,236,778 B2 | 6/2007 | Schreiber | |
| D554,474 S | 11/2007 | Miller | |
| 7,394,870 B2 | 7/2008 | Chien et al. | |
| D574,221 S | 8/2008 | Allen | |
| 7,430,257 B1 | 9/2008 | Shattil | |
| 7,433,391 B2 | 10/2008 | Stafford et al. | |
| D582,918 S | 12/2008 | Scott | |
| 7,592,953 B2 | 9/2009 | Morana | |
| 7,706,748 B2 | 4/2010 | Dutta | |
| 7,848,458 B2 | 12/2010 | Ochiai et al. | |
| 7,876,259 B2 | 1/2011 | Schuchman | |
| 8,054,866 B2 | 11/2011 | Sasaoka et al. | |
| 2002/0024965 A1 | 2/2002 | Lee | |
| 2002/0067759 A1 | 6/2002 | Ertel et al. | |
| 2002/0089434 A1 | 7/2002 | Ghazarian | |
| 2002/0097690 A1 | 7/2002 | Fleeter et al. | |
| 2002/0173888 A1 | 11/2002 | Shelton et al. | |
| 2002/0177476 A1 | 11/2002 | Chou | |
| 2002/0191632 A1 | 12/2002 | McDermott | |
| 2003/0053521 A1 | 3/2003 | Huang et al. | |
| 2003/0063576 A1* | 4/2003 | DiFazio | 370/280 |
| 2003/0123384 A1 | 7/2003 | Agee | |
| 2003/0161428 A1 | 8/2003 | Garrett et al. | |
| 2003/0202485 A1 | 10/2003 | Mansfield | |
| 2003/0204378 A1 | 10/2003 | Cai | |
| 2003/0235148 A1 | 12/2003 | Yang | |
| 2004/0001534 A1 | 1/2004 | Yang | |
| 2004/0008253 A1 | 1/2004 | Monroe | |
| 2004/0029579 A1 | 2/2004 | Kashiwase | |
| 2004/0029615 A1 | 2/2004 | Gerry et al. | |
| 2004/0059531 A1 | 3/2004 | Tomida et al. | |
| 2004/0117611 A1 | 6/2004 | Huber et al. | |
| 2004/0121729 A1 | 6/2004 | Herndon et al. | |
| 2004/0183673 A1 | 9/2004 | Nageli | |
| 2004/0246104 A1 | 12/2004 | Baechtiger et al. | |
| 2005/0038601 A1 | 2/2005 | Dentinger et al. | |
| 2005/0041573 A1 | 2/2005 | Eom et al. | |
| 2005/0060339 A1 | 3/2005 | McGee | |
| 2005/0076034 A1 | 4/2005 | Addonisio et al. | |
| 2005/0143005 A1 | 6/2005 | Moore, III | |
| 2005/0175123 A1 | 8/2005 | Gurney et al. | |
| 2005/0176436 A1 | 8/2005 | Mantravadi et al. | |
| 2005/0201311 A1 | 9/2005 | Willey et al. | |
| 2005/0201326 A1 | 9/2005 | Lakkis | |
| 2005/0248456 A1 | 11/2005 | Britton, Jr. et al. | |
| 2005/0281319 A1 | 12/2005 | Schilling | |
| 2006/0055561 A1 | 3/2006 | Kamali et al. | |
| 2006/0094450 A1 | 5/2006 | Park et al. | |
| 2006/0140314 A1 | 6/2006 | Kim et al. | |
| 2006/0141930 A1 | 6/2006 | Keen et al. | |
| 2006/0187026 A1 | 8/2006 | Kochis | |
| 2006/0233147 A1 | 10/2006 | Karabinis | |
| 2006/0251107 A1 | 11/2006 | Geren et al. | |
| 2007/0031150 A1 | 2/2007 | Fisher et al. | |
| 2007/0040647 A1 | 2/2007 | Saenz et al. | |
| 2007/0064641 A1 | 3/2007 | Laroia et al. | |
| 2007/0086335 A1 | 4/2007 | McCanne et al. | |
| 2007/0116158 A1 | 5/2007 | Guo et al. | |
| 2007/0117515 A1 | 5/2007 | Sinibaldi et al. | |
| 2007/0130599 A1 | 6/2007 | Monroe | |
| 2007/0202816 A1 | 8/2007 | Zheng | |
| 2007/0223425 A1 | 9/2007 | Masui et al. | |
| 2007/0291826 A1 | 12/2007 | Hafuka | |
| 2007/0293149 A1 | 12/2007 | Wubker | |
| 2007/0298786 A1 | 12/2007 | Meyers et al. | |
| 2008/0030345 A1 | 2/2008 | Austin et al. | |
| 2008/0043653 A1 | 2/2008 | Lakkis | |
| 2008/0181170 A1* | 7/2008 | Branlund et al. | 370/328 |
| 2009/0042516 A1 | 2/2009 | Karabinis | |
| 2009/0046771 A1 | 2/2009 | Abe et al. | |

(56) References Cited

U.S. PATENT DOCUMENTS

| | | | |
|---|---|---|---|
| 2009/0135954 | A1 | 5/2009 | Salhov et al. |
| 2009/0175299 | A1 | 7/2009 | Hosokawa et al. |
| 2009/0238246 | A1 | 9/2009 | Dawid et al. |
| 2009/0257517 | A1 | 10/2009 | Nordstrom et al. |
| 2009/0279620 | A1 | 11/2009 | Schenk |
| 2009/0298422 | A1 | 12/2009 | Conroy et al. |
| 2009/0316759 | A1* | 12/2009 | Zeira .................... 375/141 |
| 2010/0064091 | A1 | 3/2010 | Futenma et al. |
| 2010/0166180 | A1 | 7/2010 | Steer et al. |
| 2010/0322334 | A1 | 12/2010 | Wang et al. |
| 2011/0038261 | A1 | 2/2011 | Carlstrom |

OTHER PUBLICATIONS

Candell, Notice of Allowance, U.S. Appl. No. 12/692,789, May 10, 2013, 6 pgs.
Candell, Office Action, U.S. Appl. No. 12/692,789, Sep. 21, 2012, 10 pgs.
Candell, Office Action, U.S. Appl. No. 12/692,789, Mar. 30, 2012, 8 pgs.
Comtech, ISR/WO, PCT/US2006/042524, Apr. 22, 2008, 13 pgs.
Comtech, ISR/WO, PCT/US2006/049656, Feb. 21, 2008, 12 pgs.
Comtech, ISR/WO, PCT/US2007/063986, Oct. 26, 2007, 13 pgs.
DVB User Guidelines for the Second Generation System for Broadcasting, Interactive Services, News Gathering and Other Broadband Satellite Applications (DVB-S2), ETSI TR 102 376 v.1.1.1 Technical Report, 2005, 104 pgs.
Evans, Satellite Communication System, Jan. 1999, cover page and p. 468.
Fleeter, Notice of Allowance, U.S. Appl. No. 10/054,175, Aug. 18, 2004, 8 pgs.
Fleeter, Notice of Allowance, U.S. Appl. No. 13/422,173, Sep. 26, 2013, 11 pgs.
Fleeter, Notice of Allowance, U.S. Appl. No. 13/422,195, Apr. 23, 2013, 9 pgs.
Fleeter, Office Action, U.S. Appl. No. 09/130,854, Nov. 22, 2000, 7 pgs.
Fleeter, Office Action, U.S. Appl. No. 10/992,173, Apr. 8, 2011, 14 pgs.
Fleeter, Office Action, U.S. Appl. No. 10/992,173, Oct. 12, 2011, 15 pgs.
Fleeter, Office Action, U.S. Appl. No. 10/992,173, Oct. 17, 2012, 17 pgs.
Fleeter, Office Action, U.S. Appl. No. 13/422,173, Jun. 8, 2012, 16 pgs.
Fleeter, Office Action, U.S. Appl. No. 13/422,173, May 20, 2013, 21 pgs.
Fleeter, Office Action, U.S. Appl. No. 13/422,195, Dec. 6, 2012, 17 pgs.
Fleeter, Office Action, U.S. Appl. No. 13/422,195, Jul. 16, 2012, 23 pgs.
Franke, Choosing the best hardware form-factor for the airborne domain o the Joint Tactical Terminal (JTT) and Joint Tactical Ration System (JTRS), 2001, 7 pgs.
Handermann, Notice of Allowance, U.S. Appl. No. 11/685,936, Dec. 1, 2009, 6 pgs.
Handermann, Office Action, U.S. Appl. No. 11/685,936, Sep. 9, 2009, 22 pgs.
Handermann, Office Action, U.S. Appl. No. 11/685,936, Oct. 20, 2008, 16 pgs.
Handermann, Supplemental Notice of Allowability, U.S. Appl. No. 11/685,936, Dec. 15, 2009, 4 pgs.
Harms, The Orbcomm experience, EMPS2004, Sep. 2004.
Holm, Why convert to a SAASM-based global positioning system, Oct. 2005.
HT PHY Specification, Enhanced Wireless Consortium publication V1.27, Dec. 23, 2005, 67 pgs.
Jordan, Office Action, U.S. Appl. No. 11/936,784, Nov. 7, 2011, 16 pgs.
Jordan, Office Action, U.S. Appl. No. 11/936,784, Aug. 27, 2010, 12 pgs.
Jordan, Office Action, U.S. Appl. No. 13/608,146, Jul. 17, 2013, 13 pgs.
McDermott, Final Office Action, U.S. Appl. No. 12/890,578, May 16, 2013, 19 pgs.
McDermott, Notice of Allowance, U.S. Appl. No. 09/513,962, Sep. 9, 2005, 4 pgs.
McDermott, Notice of Allowance, U.S. Appl. No. 10/208,882, Apr. 10, 2007, 8 pgs.
McDermott, Notice of Allowance, U.S. Appl. No. 11/739,377, Dec. 14, 2011, 7 pgs.
McDermott, Notice of Allowance, U.S. Appl. No. 11/739,377, Jul. 19, 2013, 9 pgs.
McDermott, Notice of Allowance, U.S. Appl. No. 11/876,747, Jun. 3, 2009, 7 pgs.
McDermott, Office Action, U.S. Appl. No. 09/513,962, Sep. 14, 2004, 6 pgs.
McDermott, Office Action, U.S. Appl. No. 09/513,962, Apr. 16, 2004, 10 pgs.
McDermott, Office Action, U.S. Appl. No. 09/513,962, Jun. 24, 2003, 10 pgs.
McDermott, Office Action, U.S. Appl. No. 09/513,962, May 27, 2005, 9 pgs.
McDermott, Office Action, U.S. Appl. No. 10/208,882, Jan. 3, 2007, 11 pgs.
McDermott, Office Action, U.S. Appl. No. 11/739,377, Aug. 23, 2011, 17 pgs.
McDermott, Office Action, U.S. Appl. No. 11/876,747, Nov. 28, 2008, 5 pgs.
McDermott, Office Action, U.S. Appl. No. 12/890,578, Oct. 26, 2012, 14 pgs.
McDermott, Notice of Allowance, U.S. Appl. No. 12/890,578, Oct. 28, 2013, 19 pgs.
McDermott, Specification and Drawings U.S. Appl. No. 11/876,747, Oct. 22, 2007, 28 pgs.
Meyers, Notice of Allowance, U.S. Appl. No. 11/592,008, Aug. 26, 2010, 10 pgs.
Meyers, Office Action, U.S. Appl. No. 11/592,008, Feb. 3, 2010, 24 pgs.
Meyers, Office Action, U.S. Appl. No. 11/592,008, Aug. 15, 2008, 18 pgs.
Meyers, Office Action, U.S. Appl. No. 11/592,008, May 18, 2010, 25 pgs.
Meyers, Office Action, U.S. Appl. No. 11/592,008, Mar. 19, 2009, 25 pgs.
Meyers, Office Action, U.S. Appl. No. 11/592,008, Sep. 21, 2009, 24 pgs.
Morana, Notice of Allowance, U.S. Appl. No. 11/618,379, May 13, 2009, 4 pgs.
Morana, Notice of Allowance, U.S. Appl. No. 12/585,056, Nov. 20, 2012, 5 pgs.
Morana, Notice of Allowance, U.S. Appl. No. 12/585,056, Jul. 22, 2013, 6 pgs.
Morana, Office Action, U.S. Appl. No. 11/618,379, Jan. 6, 2009, 7 pgs.
Morana, Office Action, U.S. Appl. No. 12/585,056, Oct. 13, 2011, 8 pgs.
Morana, Office Action, U.S. Appl. No. 12/585,056, Apr. 19, 2012, 5 pgs.
Morana, Office Action, U.S. Appl. No. 12/585,056, Apr. 24, 2013, 3 pgs.
Morana, Office Action, U.S. Appl. No. 29/270,057, Feb. 26, 2009, 5 pgs.
Ormesher, Current radar-responsive tag development activities at Sandia National Labs, 2004, 7 pgs.
Singleton, Final Office Action, U.S. Appl. No. 12/693,116, Aug. 1, 2013, 10 pgs.
Singleton, Office Action, U.S. Appl. No. 12/693,116, Oct. 26, 2012, 9 pgs.
Skiscim, Notice of Allowance, U.S. Appl. No. 12/101,391, Jul. 22, 2011, 18 pgs.

(56) References Cited

OTHER PUBLICATIONS

Skiscim, Office Action, U.S. Appl. No. 12/101,391, Jan. 4, 2011, 14 pgs.
Smith, Notice of Allowance, U.S. Appl. No. 12/396,447, Jun. 5, 2012, 7 pgs.
Smith, Office Action, U.S. Appl. No. 12/396,447, Dec. 5, 2011, 31 pgs.
Stafford, Notice of Allowance, U.S. Appl. No. 11/681,759, Aug. 13, 2008, 7 pgs.
Stafford, Notice of Allowance, U.S. Appl. No. 11/937,826, Jul. 29, 2011, 8 pgs.
Stafford, Office Action, U.S. Appl. No. 11/681,759, May 20, 2008, 8 pgs.
Stafford, Office Action, U.S. Appl. No. 11/681,759, Dec. 21, 2007, 7 pgs.
Stafford, Office Action, U.S. Appl. No. 11/937,826, Sep. 16, 2010, 5 pgs.
Zenick, Notice of Allowance, U.S. Appl. No. 09/045,970, Sep. 24, 2001, 3 pgs.
Zenick, Office Action, U.S. Appl. No. 09/045,970, Apr. 10, 2001, 4 pgs.
Zenick, Office Action, U.S. Appl. No. 09/045,970, Oct. 25, 2000, 6 pgs.
Jordan, Final Office Action, U.S. Appl. No. 13/608,146, Jul. 18, 2014, 16 pgs.
Jordan, Office Action, U.S. Appl. No. 13/608,146, Feb. 4, 2014, 8 pgs.

* cited by examiner

ADVANCED MULTI-USER DETECTOR

RELATED APPLICATIONS

This application is a continuation of U.S. application Ser. No. 12/692,789, filed on Jan. 25, 2010, which claims the benefit of U.S. Provisional Application Ser. No. 61/147,253, filed on Jan. 26, 2009 the content each of which is hereby incorporated by reference herein.

BACKGROUND OF THE INVENTION

1. Field of the Invention

The present invention relates to multi-user detection, and more particularly to advanced multi-user detection for mobile satellite return link receivers.

2. Discussion of the Related Art

The mobile satellite data service providers often face the challenges on the mobile satellite return link. The major challenge comes from the need to deliver and process data at an increasingly high rate and capacity while keeping the bandwidth. In a mobile satellite return link with a limited bandwidth, the data from the mobile transceivers often arrive at the earth station receiver superimposed upon one another. The signals are packed on top of each other and are congested. With a conventional spread-spectrum correlation receiver, only the user signal with a strong signal strength can be retrieved successfully. The weak user signals are buried in the signal pool and are recognized as noise due to multi-user access interference (MAI).

SUMMARY OF THE INVENTION

Accordingly, the present invention is directed to an advanced multi-user detection for mobile satellite return link receivers that substantially obviate one or more problems due to limitations and disadvantages of the related art.

An object of the present invention is to provide an iterative return link receiver that is capable of sequentially detecting user signals with different power profiles.

Another object of the present invention is to provide an advanced multi-user detector that is capable of providing high capacity multiple user detection in a limited bandwidth.

Another object of the present invention is to provide an advanced multi-user detector capable of iteratively subtracting the detected user signals from the incoming signal packet in real-time.

Another object of the present invention is to provide a feasible iterative receiver that can detect user signals in real-time using algorithms implementing static or dynamic decimation.

Another object of the present invention is to provide a feasible iterative receiver that can detect user signals in real-time using adaptive channel estimation.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the advanced multi-user detection for mobile satellite return link receiver includes a method for detecting multi-user signals including conducting a first energy burst detection detecting a first plurality of user signals as a first energy burst, attempting to decode a user signal from the first plurality of signals within the first energy burst, cancelling out a first user signal from the first energy burst if the first user signal is successfully decoded from the first energy burst, determining a second user signal to be discarded if the second user signal is not successfully decoded from the first energy burst, conducting a second energy burst detection detecting a second plurality of signals as a second burst, and iteratively cancelling out the first user signal successfully decoded from the first energy burst from the second energy burst, wherein the second energy burst detection is conducted when all user signals within the first energy burst are either cancelled out or determined to be discarded.

In another aspect, the method for detecting multi-user signals includes conducting a first energy burst detection detecting a first plurality of user signals as a first energy burst, attempting to decode a user signal from the first plurality of signals within the first energy burst, cancelling out a first user signal from the first energy burst if the first user signal is successfully decoded from the first energy burst, determining a second user signal to be discarded if the second user signal is not successfully decoded from the first energy burst, conducting a second energy burst detection detecting a second plurality of signals as a second burst, and iteratively cancelling out the first user signal successfully decoded from the first energy burst from the second energy burst, wherein when to conduct the second energy burst is predetermined using statistical information on how often energy burst detections should be made.

In another aspect, an apparatus for detecting multi-user signals includes a burst energy detector for detecting a plurality of user signals as an energy burst, a channel estimator for estimating an amount of Doppler shift and Doppler rate, and a decoder for attempting to decode a user signal from the plurality of signals within the energy burst, an iterative interference canceller for iteratively cancelling out successfully decoded user signal from the energy burst, wherein the iterative interference canceller dynamically determines whether the energy burst after the successfully decoded user signal is cancelled out should be input into the decoder or the burst energy detector.

In another aspect, the apparatus for detecting multi-user signals includes a burst energy detector for detecting a plurality of user signals as an energy burst, a channel estimator for estimating an amount of Doppler shift and Doppler rate, and a decoder for attempting to decode a user signal from the plurality of signals within the energy burst, an iterative interference canceller for iteratively cancelling out successfully decoded user signal from the energy burst, wherein the iterative interference canceller statically determines whether the energy burst after the successfully decoded user signal is cancelled out should be input into the decoder or the burst energy detector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

When the number of units communicating in a single satellite channel increases, the return link system encounters significant processing limitations. For example, when more than 1000 units operate in a single satellite channel simultaneously, the return link system can collapse. When the system collapses, the received data is merely noise because of multi-user access interference and thus, not a single user signal can be detected.

As an example, when the signals transmitted in the satellite channel are voice signals, the receiver would recognize the multiple signals collectively as emanating from the ground platforms. However, the multiple signals would be analogous to a screaming crowd because not a single voice can be separated out.

The present invention allows one to separate out the individual voices so that each voice can be heard using iterative cancellation. In addition, the present invention allows one to separate out individual voices even when the number of users is greater than the maximum capacity, under which situation conventional multi-user detectors would collapse.

Figure 1:
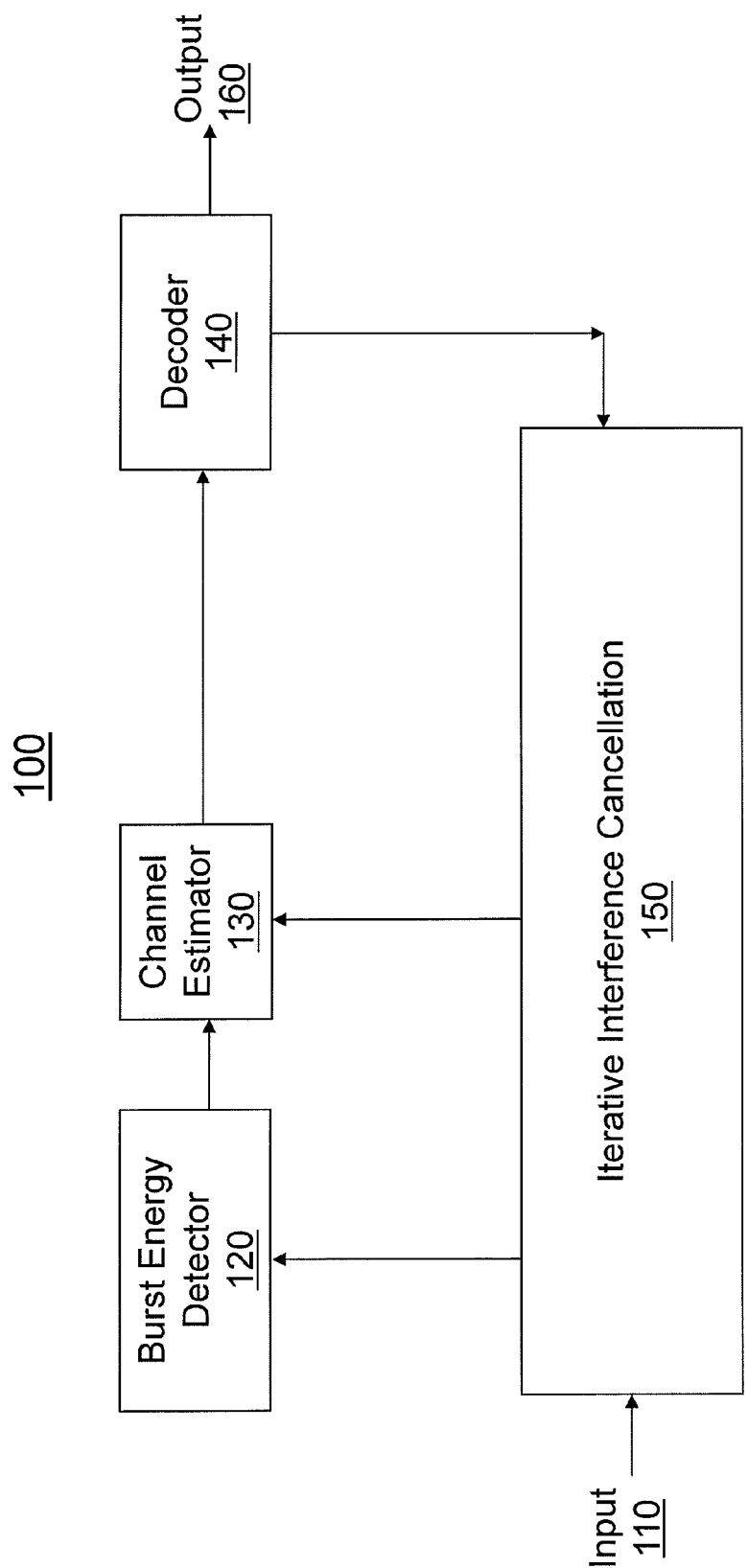
FIG. 1 is a schematic of a first exemplary embodiment of the advanced multi-user detector using iterative interference cancellation.

FIG. 1 is a schematic of a first exemplary embodiment of the advanced multi-user detector using iterative interference cancellation. The advanced multi-user detector 100 within a return link receiver (not shown) includes an input port 110, a burst energy detector (BED) 120, a channel estimator 130, a decoder 140, a circuit for iterative interference cancellation 150, and an output port 160. In the present invention, advanced multi-user detection (AMD) is applied in an operational satellite channel as an exemplary embodiment. Accordingly, the channel estimator includes elements that can estimate the amount of Doppler shift in frequency which arises from the motions of the satellite and Doppler rate.

Signals from multiple users are received at the input port 110 of the advanced multi-user detector 100. These signals from multiple users typically have different power levels and profiles when they are received by the return link receiver because the signal paths are different for individual signals that are received by the return link receiver. The signals from multiple users are received as energy bursts. The return link receiver equipped with advanced multi-user detector 100 detects the energy burst in the energy burst detector 120.

Once the energy burst detector 120 detects the energy burst, the signals within the energy burst are decoded by the decoder 140 after channel estimation is performed in the channel estimator 130. Typically, the signals with the highest power levels are decoded first within the decoder 140 because the signals with the highest power levels are easier to be detected within the energy burst.

Once these signals with the highest power levels are detected and decoded, they are iteratively cancelled out from the energy burst in the circuit for iterative interference cancellation 150. Because the user signals that have highest power levels are typically detected first, these signals with the highest power levels are canceled out first in the circuit for iterative interference cancellation 150. Thereafter, the user signals that have the next highest power levels after cancellation are detected and iteratively canceled out. As a result, the weaker user signals are sequentially detected and decoded. As shown in FIG. 1, the channel estimator 130 of the advanced multi-user detector 100 can conduct channel estimation before each attempt to decode subsequent user signals in the decoder 140 after iteratively cancelling out a user signal.

Figure 2:
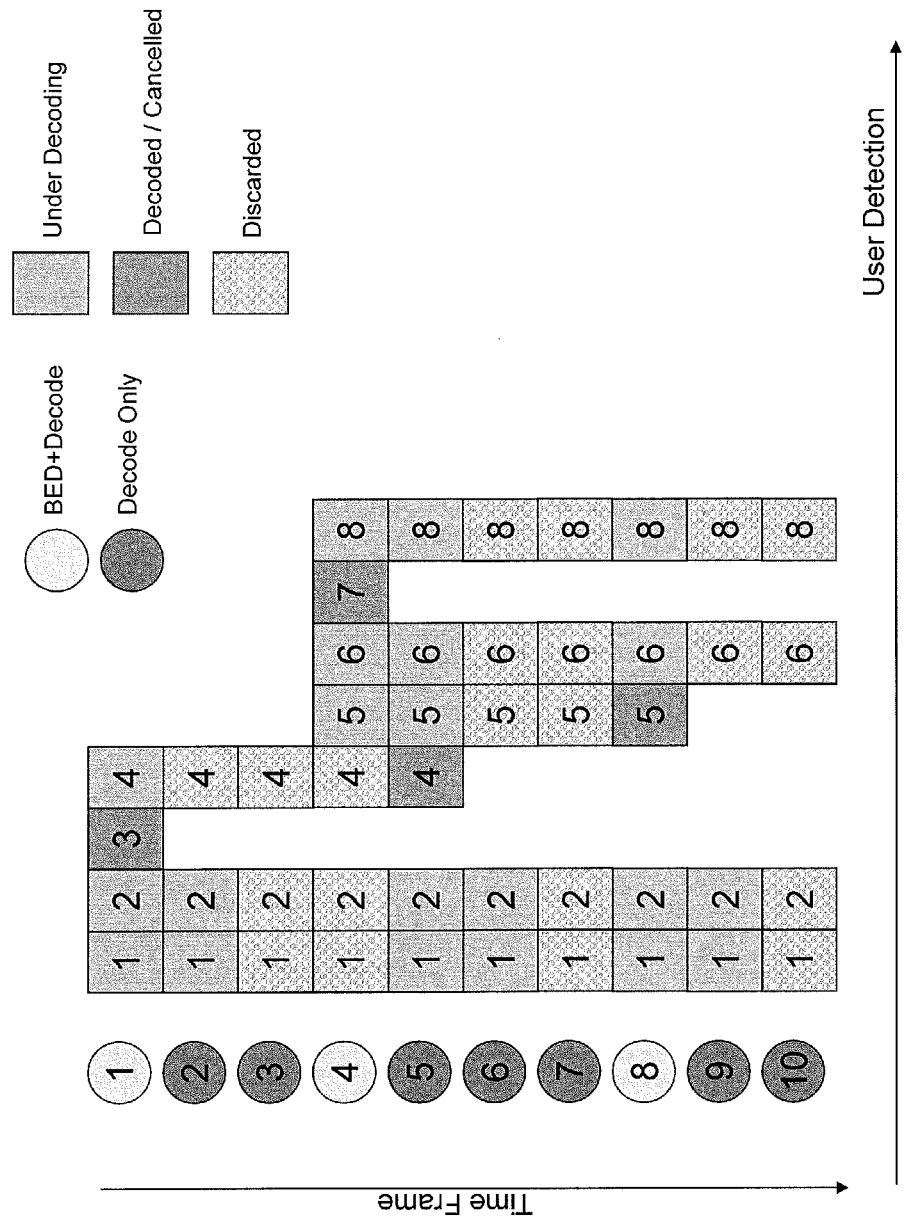
FIG. 2 is a figure demonstrating the operating mechanism of the first exemplary embodiment of the present invention with dynamic energy burst detection.

FIG. 2 is a figure demonstrating the operating mechanism of the first exemplary embodiment of the present invention with dynamic energy burst detection. The horizontal axis indicates user detection. In other words, the numbers 1, 2, 3, . . . 8 in the squares indicate user 1, user 2, user 3, . . . and user 8. The vertical axis indicates time frames. In other words, the numbers 1, 2, 3, . . . 10 in the circles indicate step 1, step 2, step 3, . . . and step 10 according to time.

In the first step, an energy burst is detected in the burst energy detector 120. The decoder 140 attempts to decode user signals for each user sequentially after channel estimation is performed in the channel estimator 130. In the exemplary embodiment shown in FIG. 2, four users were detected in the energy burst. Accordingly, the decoder 140 attempts to decode signals from all four users. First, the decoder 140 attempts to decode signals from user 1. One of ordinary skill in the art would know that this can be done by an autocorrelation operation or a cross-correlation operation using the known basis for user 1. In the exemplary embodiment shown in FIG. 2, the decoder 140 fails to decode any signal from user 1. Then, the decoder 140 attempts to decode signals from user 2. Again, in the exemplary embodiment shown in FIG. 2, the decoder 140 fails to decode any signal from user 2. In the exemplary embodiment shown in FIG. 2, signal from user 3 is successfully decoded as having the highest power levels. One of ordinary skill in the art would know that user 3 is chosen merely for demonstrational purpose and other users can have the highest power levels in other examples. Because the signal from user 3 was decoded and was output as decoded data in the output port 160 of the advanced multi-user detector 100, this signal from user 3 is cancelled out in the circuit for iterative interference cancellation 150. In the exemplary embodiment shown in FIG. 2, the decoder 140 then attempts but fails to decode any signal from user 4.

In the second step, further attempts to decode signals from users 1 and 2 are made without an additional burst energy detection. An additional burst energy detection is not made because the attempts to decode the signals from users 1 and 2 in the first step were made before the cancellation of decoded signal from user 3. Therefore, there is a need to re-attempt to decode signals from users 1 and 2 in the second step before determining users 1 and 2 to be discarded and conducting an additional burst energy detection thereafter. In the exemplary embodiment shown in FIG. 2, the attempt to decode signals from users 1 and 2 in the second step is also unsuccessful. User 4 is automatically determined to be discarded because an attempt to decode the signals from user 4 was already made after cancelling out the decoded signal from user 3 in the first step, without success.

In the exemplary embodiment shown in FIG. 2, further attempts to decode signals from users 1 and 2 are not successful in the second step. Again, one of ordinary skill in the art would know that this arrangement is merely for demonstrational purpose and the attempts to decode signals from user 1 and 2 may be, in fact, successful in different scenarios. Accordingly, in the third step, users 1 and 2 are determined to be discarded.

In the fourth step, because signals from all users are either cancelled out or determined to be discarded, a second energy burst detection is performed in the burst energy detector 120. Because the signal from user 3 was decoded and cancelled out from the energy burst, typically because it is a signal with the highest power level, a second energy burst detection can result in detecting more user signals. In the exemplary embodiment shown in FIG. 2, eight users were detected in the second energy burst detection. Users 1, 2, and 4 were determined to be discarded in step 3. Because there was no additional user signal that was decoded and cancelled out, users 1, 2, and 4 remain discarded in the fourth step. Then, the decoder 140 attempts to decode signals from user 5. In the exemplary embodiment shown in FIG. 2, the decoder 140 fails to decode any signal from user 5. Thereafter, the decoder 140 attempts to decode signals from user 6. Again, in the exemplary embodiment shown in FIG. 2, the decoder 140 fails to decode any signal from user 6. In the exemplary embodiment shown in FIG. 2, signal from user 7 was successfully decoded as having the next highest power level. Because signal from user 7 was decoded and was output as decoded data in the output port 160 of the advanced multi-user detector 100, this signal from user 7 is then cancelled out in the circuit for iterative interference cancellation 150. In the exemplary embodiment shown in FIG. 2, the decoder 140 then attempts but fails to decode signals from user 8.

In the fifth step, further attempts to decode signals from users 1, 2, and 4 are made without an additional burst energy detection. Although users 1, 2, and 4 were determined to be discarded in steps 3 and 4, further attempts to decode signals from users 1, 2, and 4 are necessary because the second highest signal level, i.e., signal from user 7, was decoded and cancelled out after the determination that users 1, 2, and 4 were discarded. In the exemplary embodiment shown in FIG. 2, the decoder 140 fails to decode any signal from users 1 and 2. However, the decoder 140 successfully decodes and cancels out signal from user 4, which is typically because it is the third highest signal level within the energy burst. Because the signal from user 4, i.e., the third highest signal level, was decoded and canceled out from the energy burst, further attempts to decode signals from users 5, 6, and 8 are necessary. If the signal from user 4 was not decoded and cancelled out in step 5, no additional attempt to decode signal from user 8 would be necessary because an attempt was already made in the fourth step after signal from user 7 was decoded and cancelled out. However, because there was an additional cancellation of signals in the fifth step after the attempt to decode signals from user 8 was made in the fourth step, further attempt to decode signals from user 8 is necessary in the fifth step.

In the sixth step, further attempts to decode signals from users 1 and 2 are made because the attempts to decode signals from users 1 and 2 were only made before the cancellation of signal from user 4 in the fifth step. Users 5, 6, and 8 are automatically determined to be discarded in the sixth step because attempts to decode signals from users 5, 6, and 8 were already unsuccessfully in the attempts made in the fifth step after signal from user 4 was cancelled out.

In the exemplary embodiment shown in FIG. 2, further attempts to decode signals from users 1 and 2 are not successful in the sixth step. Again, one of ordinary skill in the art would know that this arrangement is merely for demonstrational purpose and the attempts to decode signals from user 1 and 2 may be, in fact, successful in different scenarios. Accordingly, in the seventh step, users 1 and 2 are determined to be discarded.

In the eighth step, a third energy burst detection is performed in the burst energy detector 120 because all users were either cancelled out or determined to be discarded. In this exemplary embodiment, eight users were detected in the third energy burst detection. Because no additional users were detected, attempts to decode signals are made from all users that are not cancelled out. In the exemplary embodiment shown in FIG. 2, attempts to decode signals from users 1 and 2 are made without success. In addition, the attempt to decode signal from user 5 is successful while the attempts to decode signals from users 6 and 8 are unsuccessful.

In the ninth step, further attempts to decode signals from users 1 and 2 are made because the attempts to decode signals from users 1 and 2 were only made before the cancellation of signal from user 5 in the seventh step. Users 6 and 8 are automatically determined to be discarded in the ninth step because attempts to decode signals from users 6 and 8 have already been made in the eighth step after signal from user 5 was cancelled out.

In the exemplary embodiment shown in FIG. 2, further attempts to decode signals from users 1 and 2 are not successful. Accordingly, in the tenth step, users 1 and 2 are determined to be discarded.

Figure 3:
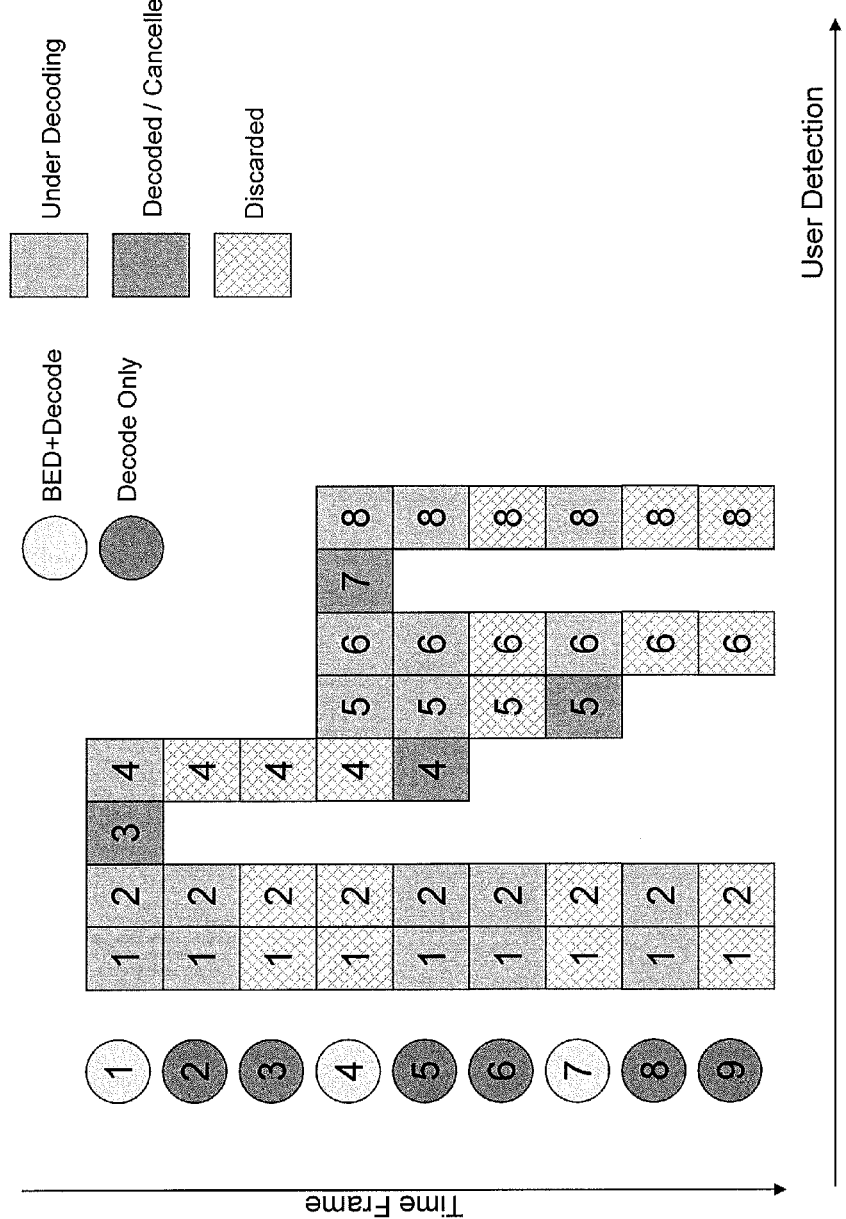
FIG. 3 is a figure demonstrating the operating mechanism of the second exemplary embodiment of the present invention with static energy burst detection.

FIG. 3 is a figure demonstrating the operating mechanism of the second exemplary embodiment of the present invention with static energy burst detection. As in FIG. 2, the horizontal axis indicates user detection. In other words, the numbers 1, 2, 3, . . . 8 in the squares indicate user 1, user 2, user 3, . . . and user 8. As in FIG. 2, the vertical axis indicates time frames. In other words, the numbers 1, 2, 3, . . . 9 in the circles indicate step 1, step 2, step 3, . . . and step 9 according to time. Unlike the first exemplary embodiment in FIG. 2, when to perform burst energy detection is not determined dynamically, but rather statically. In the exemplary embodiment shown in FIG. 4, the burst energy detector 120 is predetermined to perform burst energy detections on steps 1, 4, and 7.

In the first step, an energy burst is detected in the burst energy detector 120. The decoder 140 attempts to decode user signals for each user sequentially after channel estimation is performed in the channel estimator 130. In the exemplary embodiment shown in FIG. 3, four users were detected in the energy burst. Accordingly, the decoder 140 attempts to decode signals from all four users. First, the decoder 140 attempts to decode signals from user 1. In the exemplary embodiment shown in FIG. 3, the decoder 140 fails to decode any signal from user 1. Then, the decoder 140 attempts to decode signals from user 2. Again, in the exemplary embodiment shown in FIG. 3, the decoder 140 fails to decode any signal from user 2. In the exemplary embodiment shown in FIG. 3, signal from user 3 is successfully decoded as having the highest power levels. Because signal from user 3 was decoded and was output as decoded data in the output port 160 of the advanced multi-user detector 100, this signal from user 3 is cancelled out in the circuit for iterative interference cancellation 150. In the exemplary embodiment shown in FIG. 3, the decoder 140 then attempts but fails to decode any signal from user 4.

In the second step, further attempts to decode signals from users 1 and 2 are made. In the exemplary embodiment shown in FIG. 3, the attempt to decode signals from users 1 and 2 in the second step is also unsuccessful. User 4 is automatically determined to be discarded because an attempt to decode the signals from user 4 was already made after cancelling out the decoded signal from user 3 in the first step, without success.

In the exemplary embodiment shown in FIG. 3, further attempts to decode signals from users 1 and 2 are not successful in the second step. Accordingly, in the third step, users 1 and 2 are determined to be discarded.

In the fourth step, not because signals from all users are either cancelled out or determined to be discarded, but because the fourth step is predetermined to be a step wherein a second energy burst detection is to be performed, a second energy burst detection is performed in the burst energy detector 120. Because the signal from user 3 was decoded and cancelled out from the energy burst, typically because it is a signal with the highest power level, a second energy burst detection can result in detecting more user signals. In the exemplary embodiment shown in FIG. 3, eight users were detected in the second energy burst detection. Users 1, 2, and 4 were determined to be discarded in step 3. Because there was no additional user signal that was decoded and cancelled out, users 1, 2, and 4 remain discarded in the fourth step. Then, the decoder 140 attempts to decode signals from user 5. In the exemplary embodiment shown in FIG. 3, the decoder 140 fails to decode any signal from user 5. Thereafter, the decoder 140 attempts to decode signals from user 6. Again, in the exemplary embodiment shown in FIG. 3, the decoder 140 fails to decode any signal from user 6. In the exemplary embodiment shown in FIG. 3, signal from user 7 was successfully decoded as having the next highest power level. Because signal from user 7 was decoded and was output as decoded data in the output port 160 of the advanced multi-user detector 100, this signal from user 7 is then cancelled out in the circuit for iterative interference cancellation 150. In the exemplary embodiment shown in FIG. 3, the decoder 140 then attempts but fails to decode signals from user 8.

In the fifth step, further attempts to decode signals from users 1, 2, and 4 are made. Although users 1, 2, and 4 were determined to be discarded in steps 3 and 4, further attempts to decode signals from users 1, 2, and 4 are necessary because the second highest signal level, i.e., signal from user 7, was decoded and cancelled out after the determination that users 1, 2, and 4 were discarded. In the exemplary embodiment shown in FIG. 3, the decoder 140 fails to decode any signal from users 1 and 2. However, the decoder 140 successfully decodes and cancels out signal from user 4, which is typically because it is the third highest signal level within the energy burst. Because the signal from user 4, i.e., the third highest signal level, was decoded and canceled out from the energy burst, further attempts to decode signals from users 5, 6, and 8 are necessary. If the signal from user 4 was not decoded and cancelled out in step 5, no additional attempt to decode signal from user 8 would be necessary because an attempt was already made in the fourth step after signal from user 7 was decoded and cancelled out. However, because there was an additional cancellation of signals in the fifth step after the attempt to decode signals from user 8 was made in the fourth step, further attempt to decode signals from user 8 is necessary in the fifth step.

In the sixth step, further attempts to decode signals from users 1 and 2 are made because the attempts to decode signals from users 1 and 2 were only made before the cancellation of signal from user 4 in the fifth step. Users 5, 6, and 8 are automatically determined to be discarded in the sixth step because attempts to decode signals from users 5, 6, and 8 were already unsuccessful in the attempts made in the fifth step after signal from user 4 was cancelled out.

In the seventh step, a third energy burst detection is performed in the burst energy detector 120 because the seventh step is a predetermined step wherein a third burst energy detection is scheduled. In this exemplary embodiment, eight users were detected in the third energy burst detection. Attempts to decode signals from users 1 and 2 in the sixth step were already unsuccessful and there was no additional cancellation after the attempts to decode signals from users 1 and 2 were made in the sixth step. In addition, because users 1 and 2 have been determined to be discarded in steps 3 and 4, users 1 and 2 are automatically determined to be discarded in the seventh step without any further attempts to decode signals from users 1 and 2.

Although users 5, 6, and 8 were determined to be discarded in the sixth step and although there were no further cancellation of any signal thereafter, because another energy burst detection was performed in the seventh step, the decoder further attempts to decode signals from users 5, 6, and 8. In the exemplary embodiment shown in FIG. 3, the attempt to decode signal from user 5 is successful while the attempts to decode signals from users 6 and 8 are unsuccessful.

In the eighth step, further attempts to decode signals from users 1 and 2 are made because the attempts to decode signals from users 1 and 2 were only made before the cancellation of signal from user 5 in the seventh step. Users 6 and 8 are automatically determined to be discarded in the eighth step because attempts to decode signals from users 6 and 8 have already been made in the seventh step after signal from user 5 was cancelled out.

In the exemplary embodiment shown in FIG. 3, further attempts to decode signals from users 1 and 2 are not successful. Accordingly, in the ninth step, users 1 and 2 are determined to be discarded. In the second exemplary embodiments shown in FIG. 3, the burst energy detector 120 was predetermined to perform burst energy detections on steps 1, 4, and 7. However, one of ordinary skill in the art would know that the predetermination of [1 4 7] was merely a choice made for demonstrational purposes and can be predetermined differently.

Figure 4:
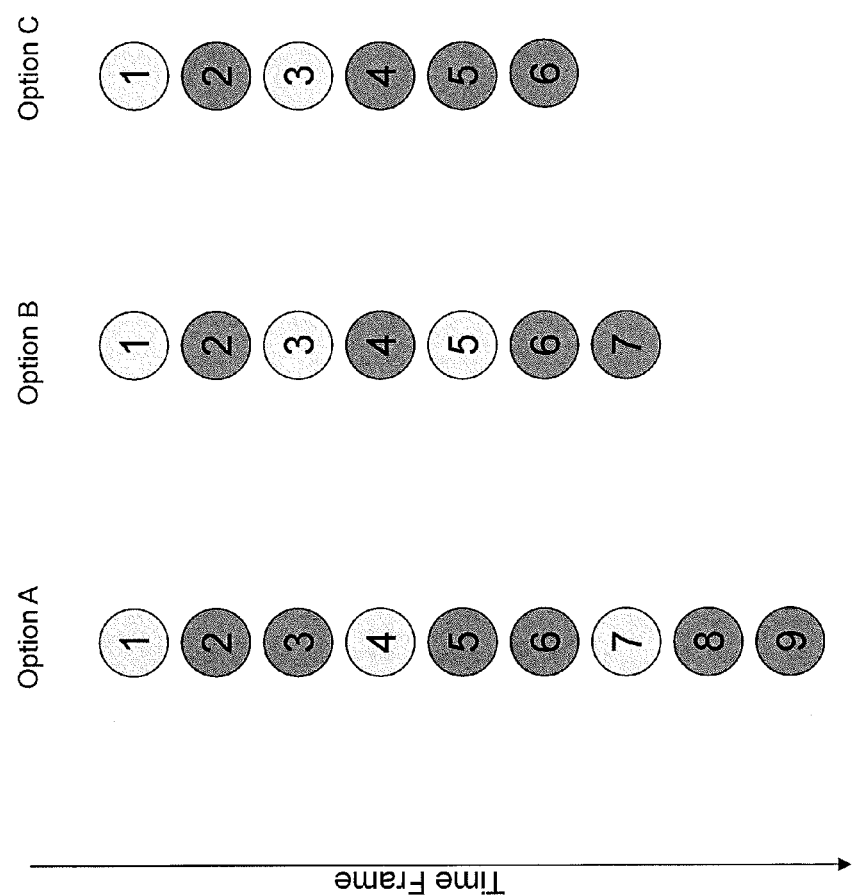
FIG. 4 is a figure demonstrating the operating mechanism of other exemplary embodiments of the present invention with static and/or dynamic decimation.

FIG. 4 is a figure demonstrating the operating mechanism of other exemplary embodiments of the present invention with static and/or dynamic decimation. Although the sequence of steps demonstrated in FIG. 3 could effectively detect and decode signals from all users, when the number of users increase, implementing the method demonstrated in the exemplary embodiment shown in FIG. 3 may be beyond current chip technologies. FIG. 4 demonstrates additional exemplary embodiments that can enable one of ordinary skill in the art to make feasible products that do not result in the return link system collapsing even when the capacity of the return link is smaller than the number of users. The exemplary embodiments in FIG. 4 decimate, i.e., skip, particular steps described in the embodiment in FIG. 3 to prevent the return link system from completely crashing.

Option A in FIG. 4 demonstrates the sequence of steps that were explained in FIG. 3. Options B and C in FIG. 4 demonstrate exemplary embodiments wherein part of the steps of Option A are statically decimated. The third step in FIG. 3 is a step that determines that users 1, 2, and 4 are discarded. Because the third step in FIG. 3 is not a critical step, we may decimate the third step. For the same reason, the sixth step in FIG. 3 is not a critical step because it is a step involving determination of discarded users. Therefore, one can decimate the third and sixth step from the embodiment in FIG. 3, which results in Option B in FIG. 4. Because the third step was decimated, the fourth step is labeled as the third step, the fifth step is labeled as the fourth step, etc. In addition, because the original sixth step, which should be labeled as the fifth step, is additionally decimated, the original seventh step is now labeled to be the fifth step in this embodiment demonstrated in Option B.

Which steps to decimate can be implemented in a static manner. In a static decimation scheme, the choice of steps that are to be decimated is predetermined and is independent of the energy profiles of the user signals in the received energy burst. The determination on which steps to decimate can be predetermined statistically using information on which steps were historically found to be not useful in the particular channel, time, and location.

However, in the embodiment that implements static decimation, there can be instances where signals from users with high power levels are not detected and/or decoded because the step that allows detection and/or decoding of signals from the particular user are inadvertently decimated. As an example, Option C is another exemplary embodiment where additional steps are decimation from Option B. Although the fifth step in Option B is the step where signals from user 5 can be decoded and cancelled out, because the steps are decimated in a static manner, this essential step can be inadvertently decimated. When the fifth step is inadvertently decimated from Option B, the sixth step will be labeled as the fifth step and the seventh step will be labeled as the sixth step in Option C. Although there can be trade-offs of not being able to detect signals from all users, the exemplary embodiment using static decimation can prevent the return link system from collapsing even when the capacity of the return link is smaller than the number of users. Accordingly, the multi-user detector 100 can be configured (not shown) to be statically (manually) switchable from Option A to Option B or further to Option C when the number of users increases. Although FIG. 4 describes only static decimation in detail, a dynamic decimation scheme can be adopted in a similar manner as described in FIG. 2, which demonstrates dynamic energy burst detection. In addition, although decimation is demonstrated only to the sequence of steps in FIG. 3, one of ordinary skill in the art would know that static or dynamic decimation can also be performed to the sequence of steps in FIG. 2 in a similar manner.

Figure 5:
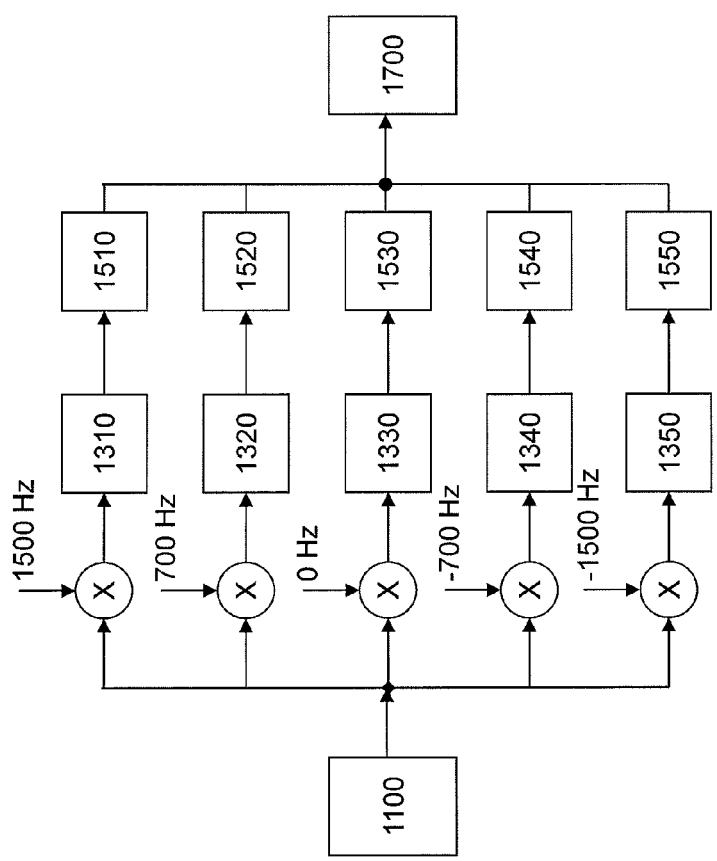
FIG. 5 is a schematic of an exemplary embodiment of the channel estimator.
Figure 6:
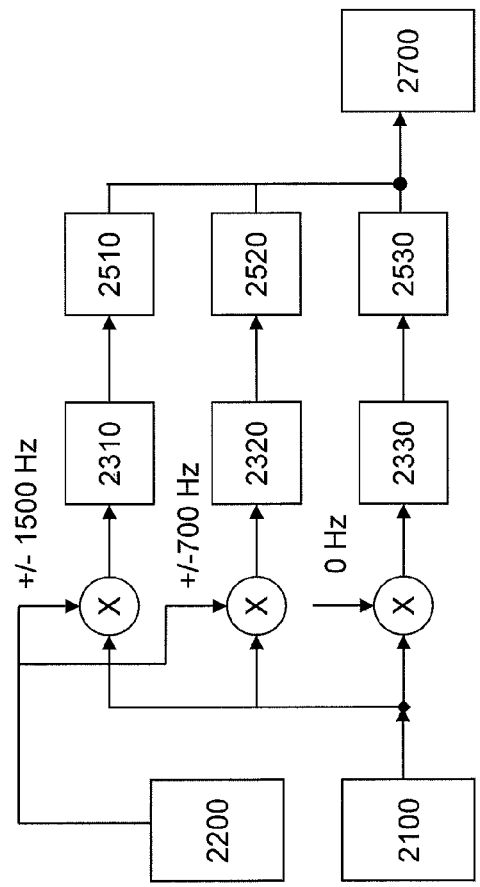
FIG. 6 is a schematic of another exemplary embodiment of the channel estimator.

FIGS. 5 and 6 are schematics of exemplary embodiments of the channel estimator. FIG. 5 shows a channel estimator 130 that can estimate the amount of the Doppler shift and Doppler rate. Because the amount of Doppler shift and Doppler rate is unknown when the energy burst is detected, a channel estimator 130 is necessary in order to compensate for the Doppler shift and Doppler rate before the energy burst can be decoded. The detected energy burst is input into the input port 1100 of the channel estimator 130. The input energy burst is modulated by sinusoidal signals having frequencies of 0 Hz, ±700 Hz, and ±1500 Hz, which are exemplary values that correspond to the motion of the satellites in an exemplary embodiment. In this exemplary embodiment, the channel estimator 130 extracts the amount of Doppler shift and Doppler rate by analyzing the frequency components of the modulated energy burst, wherein the modulating signal has frequencies of 0 Hz, ±700 Hz, and ±1500 Hz. The frequency components of the modulated signals are obtained by matched filters 1310-1350 and Fast Fourier Transform (FFT) filters 1510-1550. These frequency components of the modulated signals are input into the Doppler estimator 1700, which includes a de-multiplexer (not shown). The Doppler estimator uses these frequency components to estimate the channel.

FIG. 6 is a schematic of another exemplary embodiment of the channel estimator 130 that can estimate the amount of the Doppler shift and Doppler rate more efficiently. As in the embodiment in FIG. 5, the channel estimator 130 includes an input port 2100, matched filters 2310-2330, Fast Fourier Transform (FFT) filters 2510-2530, and the Doppler estimator 2700. In addition, the channel estimator 130 in FIG. 5 further includes a frequency sign detector 2200 that adaptively detects the sign, i.e., direction, of the Doppler shift and Doppler rate. Accordingly, rather than having four independent matched filters 1310, 1320, 1340, and 1350 and four independent FFT filters 1510, 1520, 1540, and 1550 that corresponds to ±700 Hz and ±1500 Hz frequency components, only two matched filters 2310 and 2320 and two FFT filters 2510 and 2520 are necessary to compensate for all four spectral components of ±700 Hz and ±1500 Hz. As a result, the complexity of the hardware for implementing the channel estimator 130 can be significantly reduced, especially when the channel estimators use additional sinusoidal signals with different frequencies to enhance the accuracy of the channel estimation.

It will be apparent to those skilled in the art that various modifications and variations can be made in the advanced multi-user detection for mobile satellite return link receiver of the present invention without departing from the spirit or scope of the invention. Thus, it is intended that the present invention cover the modifications and variations of this invention provided they come within the scope of the appended claims and their equivalents.

What is claimed is:

1. A method of detecting multi-user signals, the method comprising:
   detecting a first energy burst including a first plurality of user signals;
   attempting to decode a first user signal from the first energy burst;
   in accordance with a determination that the first user signal is decoded from the first energy burst, cancelling out the first user signal from the first energy burst;
   attempting to decode a second user signal from the first energy burst, wherein the second user signal is different from the first user signal;
   in accordance with a determination that the second user signal is not decoded from the first energy burst, discarding the second user signal from the first energy burst;
   detecting a second energy burst including a second plurality of user signals, wherein the second energy burst detection is conducted when all user signals within the first energy burst are either cancelled out or discarded; and
   in accordance with a determination that the first user signal is decoded from the first energy burst, cancelling out the first user signal from the second energy burst.

2. The method of claim 1, further comprising, conducting adaptive channel estimation detecting a direction of a Doppler shift and Doppler rate to compensate for the Doppler shift and Doppler rate.

3. A method of detecting multi-user signals, the method comprising:
   detecting a first energy burst including a first plurality of user signals;
   detecting a second energy burst including a second plurality of user signals, wherein the second energy burst detection is conducted in accordance with predetermined statistical information corresponding to how often energy burst detections should be made; and cancelling out a first user signal decoded from the first energy burst from the second energy burst.

4. The method of claim 3, further comprising:
attempting to decode a first user signal from the first energy burst;
in accordance with a determination that the first user signal is decoded from the first energy burst, cancelling out the first user signal from the first energy burst;
attempting to decode a second user signal from the first energy burst, wherein the second user signal is different from the first user signal; and
in accordance with a determination that the second user signal is not decoded from the first energy burst, discarding the second user signal from the first energy burst.

5. The method of claim 3, further comprising, conducting adaptive channel estimation detecting a direction of a Doppler shift and Doppler rate to compensate for the Doppler shift and Doppler rate.

6. An apparatus for detecting multi-user signals, the apparatus comprising:
a burst energy detector for detecting a plurality of user signals as an energy burst;
a channel estimator for estimating an amount of Doppler shift and Doppler rate;
a decoder for attempting to decode a user signal from the energy burst; and
an interference canceller for cancelling out a decoded user signal from the energy burst,
wherein, after the decoded user signal is cancelled out, the interference canceller determines whether to direct the energy burst to the decoder or the burst energy detector.

7. The apparatus of claim 6, wherein a user signal is discarded if the user signal is not decoded from the energy burst.

8. The apparatus of claim 7, wherein, after the decoded user signal is cancelled out, the energy burst is input into the burst energy detector when all user signals within the energy burst are either cancelled out or determined to be discarded.

9. The apparatus of claim 6, wherein the channel estimator adaptively detects a direction of the Doppler shift and Doppler rate.

* * * * *